(12) United States Patent
Massioli

(10) Patent No.: US 8,821,245 B2
(45) Date of Patent: Sep. 2, 2014

(54) NON CHANCE-BASED GAME SYSTEM

(76) Inventor: Diego Antonio Massioli, Cesano Maderno (IT)

( * ) Notice: Subject to any disclaimer, the term of this patent is extended or adjusted under 35 U.S.C. 154(b) by 0 days.

(21) Appl. No.: 13/613,385

(22) Filed: Sep. 13, 2012

(65) Prior Publication Data

US 2014/0087838 A1 Mar. 27, 2014

(51) Int. Cl.
*A63F 9/24* (2006.01)
*A63F 9/18* (2006.01)
*A63F 13/00* (2014.01)

(52) U.S. Cl.
CPC .. *A63F 13/00* (2013.01); *A63F 9/18* (2013.01)
USPC .................. 463/16; 463/25; 463/26; 463/27

(58) Field of Classification Search
USPC ......................... 463/16, 25, 26, 27
See application file for complete search history.

(56) References Cited

U.S. PATENT DOCUMENTS

| | | | | |
|---|---|---|---|---|
| 2007/0238530 A1* | 10/2007 | Okada | | 463/42 |
| 2008/0070658 A1* | 3/2008 | Labgold et al. | | 463/11 |
| 2012/0295685 A1* | 11/2012 | Odom et al. | | 463/17 |
| 2013/0310124 A1* | 11/2013 | Hauck | | 463/7 |
| 2014/0066199 A1* | 3/2014 | Takagi et al. | | 463/31 |
| 2014/0141851 A1* | 5/2014 | Rubin | | 463/9 |

* cited by examiner

*Primary Examiner* — Pierre E Elisca
(74) *Attorney, Agent, or Firm* — Modiano & Partners; Daniel O'Byrne

(57) ABSTRACT

The game system according to the present invention is a non chance-based game system, in which the winner is selected by and among the game participants, and the prize is awarded to the winner by the participants themselves through individual donations, voluntary and of moderate value, and in which a share of the prize may be donated to a charity or nonprofit organization associated with the winner.

5 Claims, 3 Drawing Sheets

NON CHANCE-BASED GAME SYSTEM

TECHNICAL FIELD

The present invention pertains to the field of prize-winning games and, specifically, to non chance-based games.

In particular, the present invention comprises a non chance-based game, in which the winner is selected by and among the game participants, and the prize is awarded by the participants themselves through individual donations, voluntary and of moderate value, and in which a share of the prize may be donated to a charity or nonprofit organization associated with the winner.

BACKGROUND OF THE INVENTION

Currently in prize-winning games, for example lotteries, the game organizer fixes the prize money and sells numbered tickets. Therefore the player purchases one or more tickets (without an expense limit and therefore a limit on purchasable tickets). At the end of a predetermined period of time, or once all the tickets are sold, the prize-winning game organizer determines, through a drawing or other system (mathematical algorithms, etc.), the winning number. The prize money is therefore awarded to the owner of the ticket carrying the winning number. This scheme is always the same in its logic and in its unpredictability, however it is susceptible to various variations, including the one called "inverse lottery", as disclosed in the US Patent application no. US 2005/0096116 A1.

Such types of prize-winning games present many drawbacks such as, for instance, the absolute unpredictability in the selection of the winner: everything depends on the circumstances that unfold, in a way that is dictated by chance, the winning conditions predetermined by the game system; for example in traditional lotteries everything depends on the chance occurrence, which is not controllable by the player, that the purchased ticket number corresponds to the number drawn by the game organizer.

Furthermore, in traditional prize-winning games there is no involvement by the players in the selection of the winner: the players can only hope that the winning conditions occur, and there is no interaction among the players.

In traditional prize-winning games there is also the possibility of the games causing gaming addiction without an expense limit (for example: buying more tickets increases the probability of winning).

Finally, traditional prize-winning games favor those who can spend the most (who can purchase more tickets or, in any case, participate in the game more times), to the detriment of those who have greater necessity of winning (because they are needy or because they would invest that money in a meritorious work); there is, at the conclusion of the game, the impoverishment of some people (the players who lost and who spent money in order to participate in the game) against the winning of a single person (or of very few people or in any case a limited number of subjects), generating such a system of competition among the players inasmuch as only one (or few) can win, the others necessarily lose.

SUMMARY OF THE INVENTION

The present invention overcomes all of the drawbacks of the traditional prize-winning games described above.

In particular, the present invention comprises a non chance-based game, in which the winner is selected by and among the game participants, and the prize is awarded to the winner by the participants themselves through individual donations, voluntary and of moderate value, and in which a share of the prize may be donated to a charity or nonprofit organization.

In the game system described in detail hereinafter no third party either collects money or selects a winner, but every player (or "player/giver") personally and directly assigns a part of the winnings to the winner (or "receiver"), chosen by and among the players (all of them "potential receivers"), while the other part of the winnings are destined, in one of the embodiments of the present invention, to a charity associated with the winner.

The game system according to the present invention "ennobles" the prize-winning game, creating "solidarity" in the game inasmuch as no third party collects money or selects a winner, thus making "losers" of the non-winning players. In the game system described every player personally and directly assigns (donates) a sum of money (or, in other embodiments of the inventions, a number of "credits" or "points" or equivalent analogues) to a "chosen receiver", that is, to a player chosen (through the expressed vote of the players) by and among the players themselves; a "chosen receiver" who, according to the terminology in use among traditional prize-winning games, would be the "winner" of the game; and the final prize is composed of the sum of the individual donations, voluntary and of moderate value, made by the game participants in favor of the "chosen receiver". From the viewpoint of donation, nobody ever loses since one who donates does not lose, ever.

Thanks to the game system according to the present invention the player becomes a giver and all unpredictability in the selection of the winner disappears since the winner (here called "receiver" or "chosen receiver") is chosen by means of a vote among the players: the person who has the highest number of votes from all the players will be the winner ("receiver"); and in this way there is no bringing about of gaming addiction inasmuch as playing more, that is giving more, does not increase the probability of being chosen (and therefore of being the receiver/winner) because also, in order to be eligible as a "potential receiver", it's enough to make a single donation; the game method described herein favors solidarity among givers, through direct donation and voting.

BRIEF DESCRIPTION OF THE DRAWINGS

The present invention will be now described in detail with reference to the following figures, in which.

DETAILED DESCRIPTION OF THE INVENTION

Figure 1A:
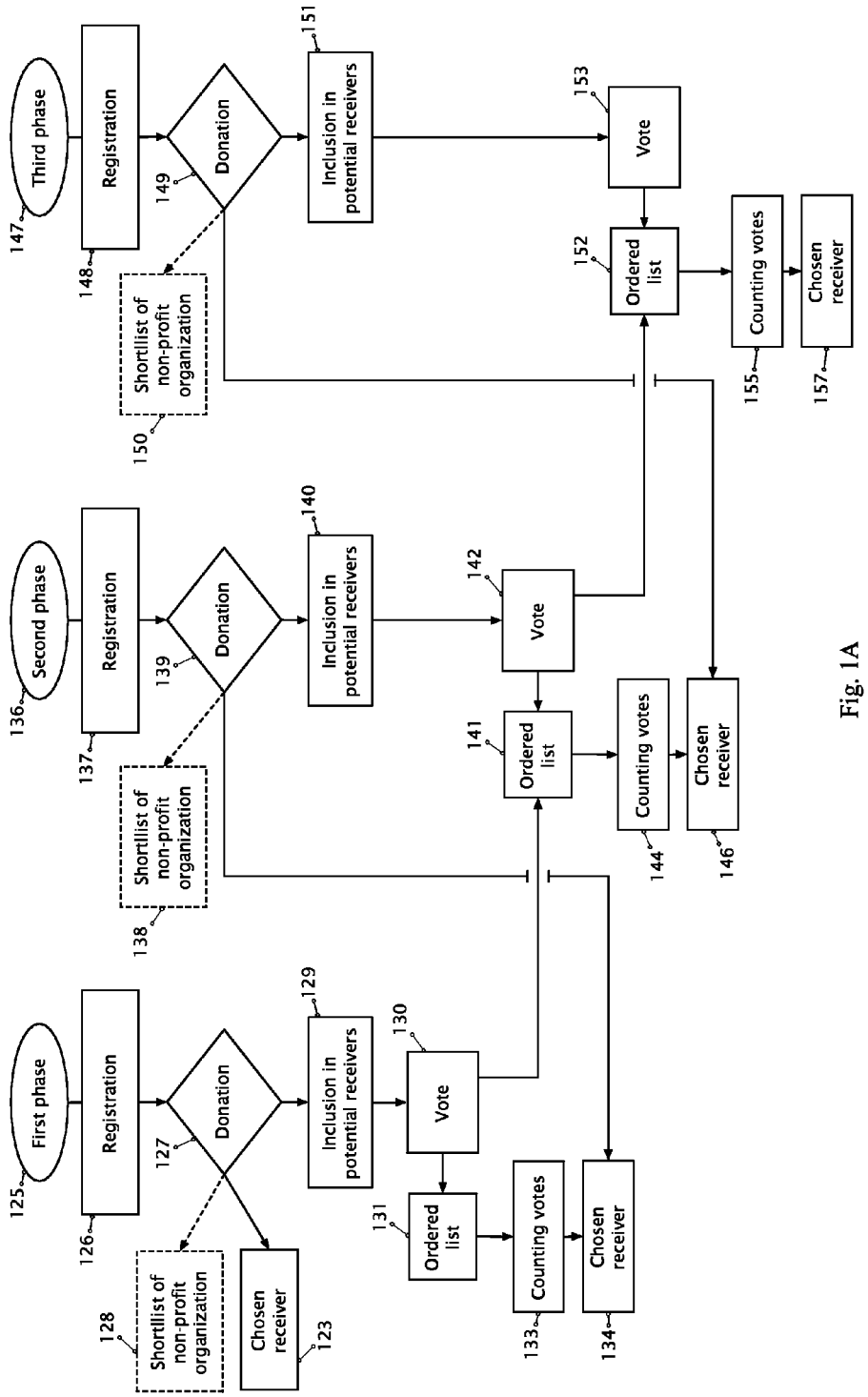
FIG. 1A is a flow chart illustrating the steps forming the game system.

In one embodiment of the invention, as shown in FIG. 1A, the player starts the game 125 giving the required personal information 126. At the time of registration, a shortlist of non-profit organizations may be presented to the player/giver 128, from which to choose the one that he or she wants to support with his or her donation; non-profit organizations which might have been previously determined by the handler of the service through methods chosen at his or her own discretion; donation that will consist of a sum of money predetermined by the system administrator and that can be of moderate value.

Once the player/giver is registered, the player/giver can choose in which form of the game he or she wants to participate, there being three subtypes of game mechanisms:

1. game mechanism in which a larger percentage of the sum donated by the player/giver is destined to a previously determined non-profit organization, and a smaller percentage of the sum donated by the player/giver is destined to the "chosen receiver" player (determined according to the mechanism described below);
2. game mechanism in which a larger percentage of the sum donated by the player/giver is destined to the "chosen receiver" player, and only a smaller percentage of the sum donated by the player/giver is destined to a non-profit organization;
3. game mechanism in which the sum donated by the player/giver is destined entirely to the "chosen receiver" player unless the "chosen receiver" player has decided, in the ways and in the time period set forth by the game, to assign a percentage, to the degree he or she has established, to a non-profit organization.

At the same time as the choice of which form of the game in which to participate is presented to the player/giver (game mechanism nos. 1, 2 or 3), the game might show to the player/giver the non-profit organization that will receive the player/giver's donation and the name (first name and last name and possibly a photo) of the "chosen receiver", that is, the recipient of the sum of money that the player/giver will have to donate (in classic game terminology: the "winner"). Once the player selects which form of the game in which to participate (1, 2 or 3) the player will be able to donate 127 to the "chosen receiver" 123 shown to the player by the system (according to the methods indicated below), otherwise the player can decide not to donate by withdrawing from the game.

After the player/giver has selected the "chosen receiver" 123 (and relevant organization) and has made the monetary donation 127, the system will have the player/giver choose— or "vote for" 130—the "potential receiver" of the next phase, that is to say the system will have the player/giver select, from a shortlist of people 131 (including all the names of the players/givers who have donated during the course of the previous phase) the person who, in their opinion, should be the next "chosen receiver"; "chosen receiver" will be the person who receives the highest number of votes from all the players/givers participating in the game and who will be the recipient ("winner") 134 of the donations and who will be indicated by the game as "receiver" in the carrying out of the following phase of the game; at the end of this phase of the game, the system will determine with a simple mathematical calculation 133, from among the "potential receivers", the person who had, in that phase of the game, the highest number of votes from the players/givers: the person who has received the highest number of votes will be the "chosen receiver" 134, the "winner", of the next phase.

In summary, as shown in FIG. 1A: after the player/giver (in the first phase of the game 125) has made his or her donation 127 and has voted 130 for the "potential receiver" 131, the system puts the name of the player/giver on the list of people 129 who, in the following phase of the game (the second phase), will be "voted for" 141, by other players/givers, as "potential receivers": the "potential receiver" who receives the highest number of votes 144 by the conclusion of the second phase of the game, will become the "chosen receiver" 146 of the following phase (the third phase). Therefore, as has been described, the game is divided into three definite time periods, which are called "phases", whose duration is established by the game administer at his or her own discretion, and each phase occurs in succession one after another without interruption:

the first phase in which user "A" enters the system, registers, or logs in if already registered, 126 makes his or her donation 127 and votes 130, from a shortlist of people 131 that includes all the players who donated during the course of the preceding phase (for example 124 of FIG. 1B) and who therefore have become the "potential receivers"; in other words the player/giver casts a vote 130 for, from among all the "potential receivers" 131, the person that he or she would like to be the "chosen receiver" in the following phase of the game;

meanwhile in the same phase of the game the player/giver is included by the system among the "potential receiver" 129 who will be voted 142 for by other players in the following phase of the game;

the second phase, directly following the first, in which that same user "A", having been included in the list of "potential receivers" 129 in the preceding phase, can therefore be the recipient of the votes 142 of the old and new users who make a donation;

the third phase, directly following the second, in which user "A", if and since he or she has received in the preceding phase (the second) the highest number of votes 144 from the players/givers, becomes "receiver" 146, that is, the person who receives the donations 149 from the players/givers will be the one who can be indicated as the "winner" of the game.

The game ends with the third phase in which user "A" either is or is not the receiver.

Figure 1B:
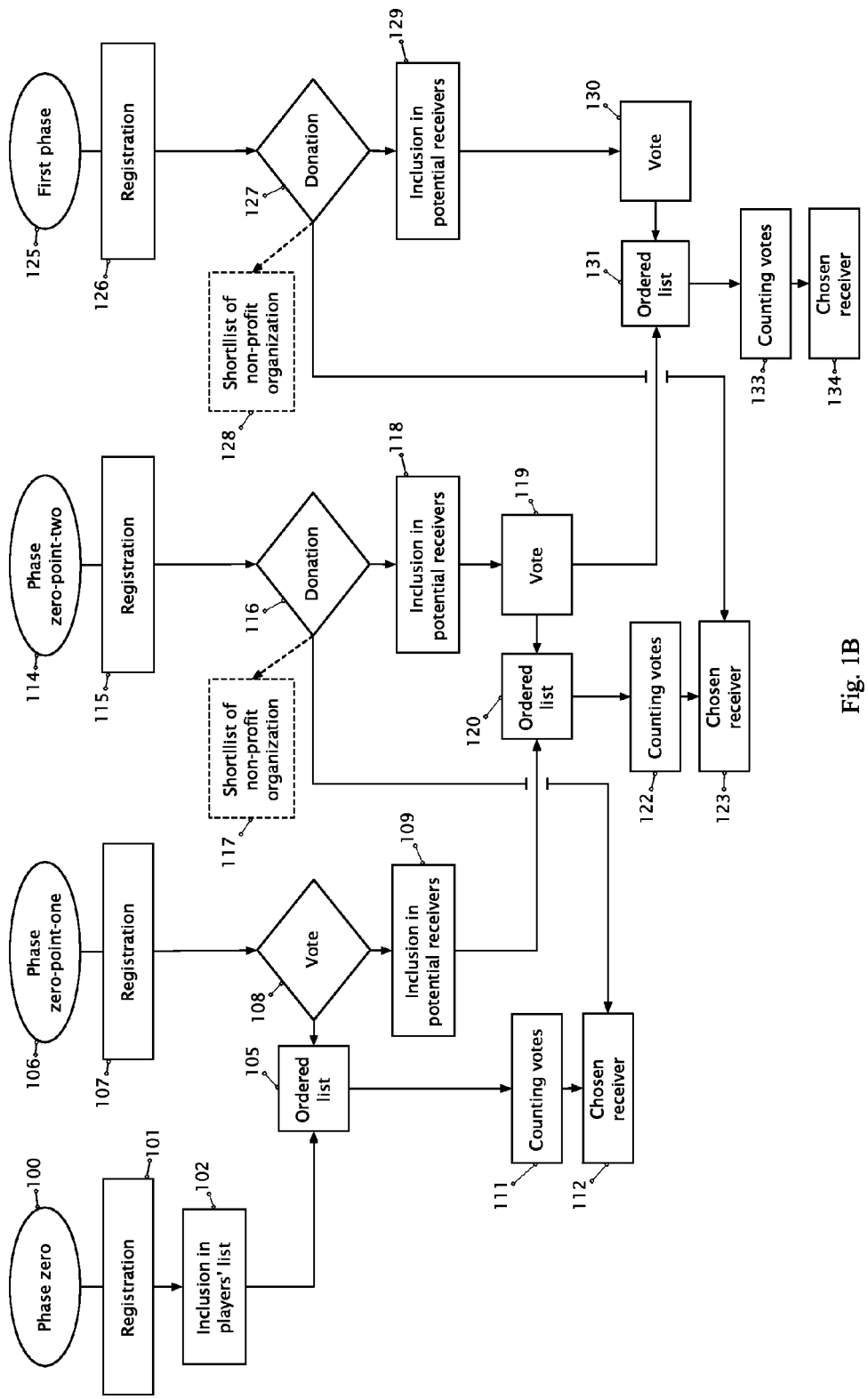
FIG. 1B is a flow chat illustrating the steps through which the game begins.

The system, as it has been described, is cyclical and, once started, can continue without end as long as it is not interrupted. The game system described thus far presupposes and provides that, at the moment in which a subject begins to play, and in one embodiment of the invention enters the site and registers, he or she already finds both a receiver (the "winner"), and a list of people (the "potential receivers") among whom to choose the receiver of the following phase. There will be however an opening phase, at the start of the game, in which there will not be any player in the game and thus there will not be any "potential receiver" and obviously there will not be any receiver. The game system described herein therefore provides, as shown in FIG. 1B, that at the start of the game the players register themselves in the game 101, following, in one embodiment of the invention, a suitable procedure to be realized on the website that hosts it, within a certain given period of time, that we now conventionally call, in order to distinguish it from the others, phase zero (0) 100.

Once the registrations are closed during phase zero, the system will start a new phase, phase zero-point-one 106, in which the users who already registered (during phase zero) and the new users, that is whoever registers during phase zero-point-one, will have to choose, or "vote for" 108, the "potential receiver" among all those who registered during phase zero 105. Once phase zero and phase zero-point-one have ended and the "receiver" is determined 112 based on the number of votes 111 expressed by the users/givers 108 during phase zero-point-one, a new phase will begin, zero-point-two 114, in which the user will give his or her donation 116 to the receiver chosen in the previous cycle 112.

It barely needs mention that the zero cycle will take place only one time during the game, at its start; once the game has started it will continue according to the three phases, one, two and three, shown and described above.

Another embodiment of the invention provides for the insertion of the game mechanism into an e-commerce website.

In this further embodiment, the e-commerce website, which sells goods and/or services, implements on its website the game system described herein seeing to it that with every purchase completed by the user, the same user receives from the website, by virtue of having made a purchase, a number of "points" or "credits" (or equivalent analogues). The game mechanism therefore provides that, in a specially organized section of the e-commerce website, the user can play according to the methods already explained in which the sum of money is substituted by "points" or "credits" (or equivalent analogues): the user will donate his or her "points" or "credits" to a "chosen receiver", choosing the "potential receiver" from a list of users and in the end the system will include the person in the list of "potential receivers" who will be "voted for" in the following phase of the game, according to the methods already explained. The receiver will then be able to use the "points" or "credits" given to him or her ("won") in order to make purchases on the e-commerce website (and its possible affiliates) which hosts the game.

Figure 2:
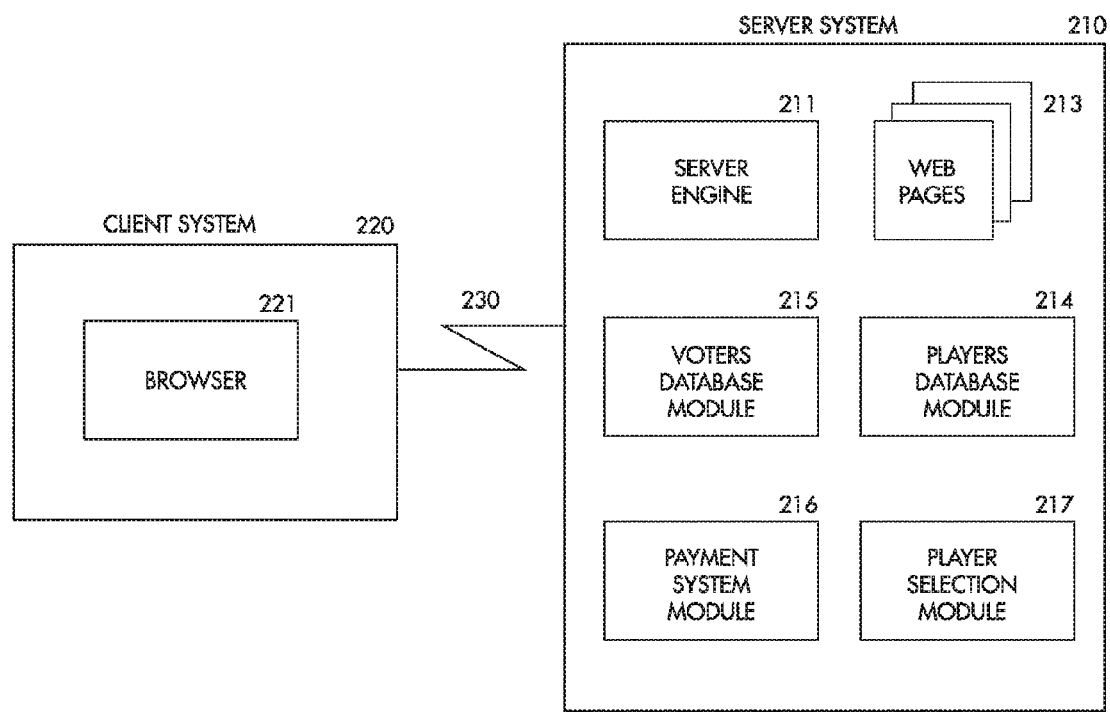
FIG. 2 is a block diagram illustrating a preferred embodiment of the present invention.

With reference to FIG. 2, a preferred embodiment of the present invention is described in detail hereinafter.

This preferred embodiment supports the game system over the Internet using the World Wide Web. The game begins with the player, who we will call for descriptive purposes "user/giver", who accesses, through a computer, the website in which the game "runs" (more accurately: the player accesses with a "client" computer, through the Internet, another computer where the software that makes the game software work is stored) and during the player's first access he or she enters the required personal information thus starting off the first phase of the game.

As shown in FIG. 2 the server system 210 includes a server engine 211, various web pages 213, a player database module 214, a voter database module 215, a payment system module 216, and a player selection module 217.

For the purpose of this disclosure a module is a software, hardware or firmware (or combination thereof) system, process or functionality, or component thereof, that performs the processes, features, and/or functions described herein, with or without human interaction or augmentation; a module can include submodules. Software components of a module may be stored on a computer-readable medium. Modules may be integral to one or more servers, or be loaded and executed by one or more servers. One or more modules may be grouped into an engine or an application and implemented by at least one processor of a computer device.

The server engine receives an HTTP request to access web pages identified by URLs and provides the web pages to the various client systems. Such an HTTP request may indicate that the player wants to login or register in order to play the game.

When a player registers or logs in, the player database module 214 stores all the information provided by each player that has registered or logged in.

The server system generates a web page 213 allowing the player to play the game and allowing him or her to donate a sum of money to the receiver by means of the payment system module 216 (allowing the player to make a donation with a credit card or by using systems like PayPal).

The server system stores all the voter information in the voter database module 215.

The server system generates a web page allowing the player to cast a vote for a player whose name is contained in the voter database.

The server system, thanks to the player selection module 217, will count which player, among those contained in the voter database, has obtained the largest number of votes from the players or it will indicate the player, through a web page, as receiver in the following phase of the game.

The server and client system interact by exchanging information via communications link 230, which may include transmission over the Internet.

While the invention here presented has been illustrated, described and defined with reference to particular preferred embodiments, these references and embodiments given in the above description do not imply any limitation of the invention.

It is, however, evident that various modifications and variations can be made without departing from the broader protective scope of the illustrated technical concept.

The illustrated preferred embodiments are merely exemplary and they are not exhaustive of the protective scope of the technical concept here presented.

Therefore, the protective scope is not limited to the preferred embodiments described in the detailed description, but is limited only by the claims that follow.

What is claimed is:

1. A non chance-based game system comprising the steps of:
   (a) allowing the player to register himself or herself by providing personal information, starting phase zero of the game;
   (b) at a given time, stopping the entrance of new players into the game, ending phase zero of the game, and creating a list of all the players who up until that time were registered during the aforementioned phase zero of the game;
   (c) starting a new phase, phase zero-point-one, in which new players can play the game by registering themselves;
   (d) allowing all players, those who entered in phase zero and those who entered in the following phase zero-point-one, to choose by voting—among the people making up the above-mentioned list created by the game in step (b) at the end of phase zero—one player only;
   (e) making a list of the players who have been voted for and identifying the one who has received the highest number of votes and who will be the "chosen receiver", that is, the winner of the game in the next phase (phase zero-point-two) of the game;
   (f) at a given time, ending phase zero-point-one and making a list of all the players who have voted, as in step (d), in the same phase zero-point-one;
   (g) starting a new phase, phase zero-point-two, in which new players may enter the game in order to play the game by providing personal information;
   (h) permitting the player to make a donation in monetary form (or by means of any other analogue) to the "chosen receiver," that is, the person who received the highest number of votes in the voting of the preceding phase as described in step (e);
   (i) permitting the player to choose, by voting from a shortlist of people including all those who voted in the preceding phase of step (d), the person who will be the chosen receiver of the following phase of the game;
   (j) creating a list of all the names of the players who have donated in this phase of the game; said list will be given to the participants of the game in the following phase from which the players will have to choose, by voting, the receiver of the following phase of the game;

(k) assigning to the chosen receiver all the sums donated to him or her by the players in this phase (zero-point-two) of the game;
(l) again, starting another phase of the game (firts phase) in which the player is made to choose, after he or she has provided personal information, which game method to use, as there may be various game methods;
(m) the game permitting the player to make a donation in monetary form (or with any other analogue) to the "chosen receiver", that is, the person who received the highest number of votes in the voting of the preceding phase based on the mechanism of step (j);
(n) permitting the player to choose, by voting from a shortlist of people including all those who (from this phase on not voted anymore but:) donated in the preceding phase of step (h), the person who will be the chosen receiver of the following phase of the game;
(o) creating a list of all the names of the players who have donated in this first phase of the game; said list will be given to the participants of the game in the following phase from which the players will have to choose, by voting, the receiver of the following phase of the game;
(p) assigning to the chosen receiver all the sums donated to him or her by the players in this phase (m) of the game;
the game repeating the first phase in a loop (steps (l) to (p)) until terminated.

2. The non chance-based game system according to claim 1, wherein the steps of the game are carried out with the use of a personal computer but without using the Internet.

3. A non chance-based game system residing on an Internet website that is accessible by a number of players, and comprising: the use of a client(s) system and the Internet and also comprising the steps of:
(a) starting the game and causing the display of a web page where a player can register, or log in if already registered, to play the game by providing identification and a password, and thus starting phase zero of the game;
(b) the game, at a given time, stopping the logging in or registration of new players, ending phase zero of the game, and creating a list of all the players who up until that time were registered during phase zero of the game;
(c) the game starting a new phase, phase zero-point-one, in which new players can register, or log in if already registered, to play the game by providing identification and a password;
(d) the game allowing all players, those who entered in phase zero and those who entered in the new following phase, to choose by voting—among the people making up the above-mentioned list created by the game in step (b) at the conclusion of phase zero—one player only;
(e) the game making a list of the players who have been voted for and identifying the one who has received the highest number of votes and who will be the "chosen receiver," that is, the winner of the game in the next phase (phase zero-point-two) of the game;
(f) the game, at the end of phase zero-point-one, making a list of all the players who have voted in the same phase zero-point-one;
(g) the game starting a new phase, phase zero-point-two, in which new players can register, or log in if already registered, to play the game by providing identification and a password;
(h) the game permitting the player to make a donation in monetary form, by means of a payment method over the Internet, to the "chosen receiver," that is, the person who received the highest number of votes in the voting of the preceding phase as described in step (e);
(i) the game permitting the player to choose, voting from a shortlist of people including all those who voted in the preceding phase of step (d), the person who will be the chosen receiver of the following phase of the game;
(j) the game creating a list of all the names of the players who have donated in this first phase of the game; said list will be given to the participants of the game in the following phase from which the players will have to choose, by voting, the receiver of the following phase of the game;
(k) the game assigning to the chosen receiver all the sums donated to him or her by the players in this phase (zero-point-two) of the game;
(l) the game again starting another phase of the game (first phase) causing the display of a first predetermined area in which to make the player choose, after he or she has registered or logged in, which game method to use, as there may be various game methods;
(m) the game permitting the player to make a donation in monetary form, by means of a payment method over the Internet, to the "chosen receiver", that is, the person who received the highest number of votes in the voting of the preceding phase based on the mechanism of step (j);
(n) the game permitting the player to choose, by voting from a shortlist of people including all those who (from this phase on not voted anymore but:) donated in the preceding phase of step (h), the person who will be the chosen receiver of the following phase of the game;
(o) the game creating a list of all the names of the players who have donated in this first phase of the game; said list which will be given to the participants of the game in the following phase from which the players will have to choose, by voting, the receiver of the following phase of the game;
(p) the game assigning to the chosen receiver all the sums donated to him or her by the players in this first phase of the game;
the game repeating the first phase in a loop (steps (l) to (p)) until terminated.

4. The non chance-based game system according to claim 1 or 3, wherein the game offers various forms of donation among which are: the form in which the donated sum is destined to a charity selected by the player, or by the receiver/winner, or by the game itself; the form in which a larger percentage of the sum donated by the player/giver is destined to a previously determined non-profit organization and a smaller percentage of the sum donated by the player/giver is destined to the "chosen receiver" player; the form in which a larger percentage of the sum donated by the player/giver is destined to the "chosen receiver" player and only a smaller percentage of the sum donated by the player/giver is destined to a non-profit organization; the form in which the sum donated by the player/giver is destined entirely to the "chosen receiver" player unless the "chosen receiver" player has decided, in the ways and in the time period set forth by the game, to assign a percentage, to the degree he or she has established, to a non-profit organization.

5. The non chance-based game system according to claim 1 or 3, wherein the game is implemented in an e-commerce website which sees to it that with every purchase completed by the user, the same user receives from the website, by virtue of having made a purchase, a number of "points" or "credits" (or equivalent analogues); the game system provides that the user can play according to the methods already explained in claims 1 and 3 in which the sum of money is substituted by "points" or "credits" (or equivalent analogues) and in which the user will give his or her "points" or "credits" to a "receiver", the user will choose the "potential receiver" from a list of users and in the end the system will include the person in the list of "potential receivers" who will be "voted for" in the following phase of the game, according to the methods already explained in claims 1 and 3; the receiver then being able to use the "points" or "credits" given to him or her ("won") in order to make purchases on the e-commerce website (and its possible affiliates) which hosts the game.

* * * * *